United States Patent Office 2,712,538
Patented July 5, 1955

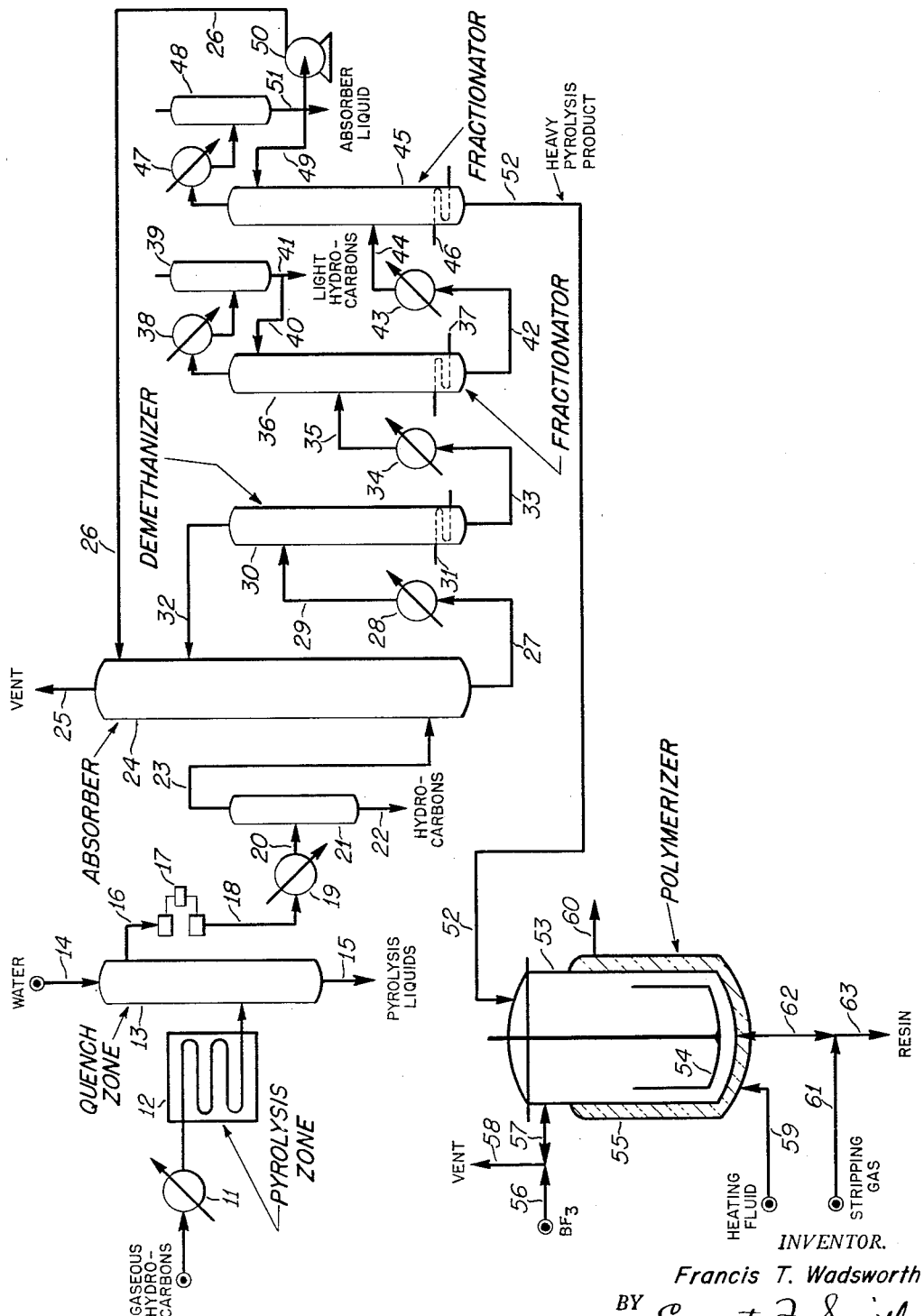

2,712,538

SYNTHETIC RESINS FROM HYDROCARBON PYROLYSIS PRODUCTS

Francis T. Wadsworth, Dickinson, Tex., assignor, by mesne assignments, to Pan American Refining Corporation, Texas City, Tex., a corporation of Texas Application July 27, 1951, Serial No. 239,000

6 Claims. (Cl. 260—82)

This invention relates to synthetic resins and particularly to synthetic hydrocarbon resins. More specifically, my invention relates to the production of synthetic hydrocarbon resins from a normally liquid mixture of unsaturated hydrocarbons obtained in the high-temperature pyrolysis of normally gaseous hydrocarbons.

It is well known that resins can be produced from unsaturated hydrocarbons by thermal or catalytic polymerization thereof. It is also well known that unsaturated hydrocarbon mixtures suitable for the production of resins can be produced by the high-temperature pyrolysis of gaseous hydrocarbons, in which the hydrocarbons undergo a complex group of reactions, including cracking, dehydrogenation, conjugation, aromatization, polymerization, and the like, whereby the hydrocarbons are converted into a heterogeneous mixture comprising olefins, diolefins, cycloolefins, aromatics, and numerous other constituents of surprisingly diverse physical properties, extending from ethylene to solids of high melting point. This mixture of materials has been the subject of very extensive experimental work to prepare useful products therefrom, including pure aromatics, pure olefins and diolefins, and resins. The resins have in general been of limited utility, however, owing to their undesirably dark color, their color instability, and their tendency toward mechanical failure during aging.

I have now discovered that stable resins of good color and low iodine number can be prepared by polymerization of a specific unsaturated hydrocarbon fraction, to be defined hereinafter, obtained from the products of pyrolysis of normally gaseous hydrocarbons containing two or more carbons atoms in the molecule. My new resins are obtained by polymerizing the said unsaturated hydrocarbon fraction in the presence of a catalyst containing boron trifluoride as the essential constituent thereof.

One object of my invention is to prepare a hydrocarbon resin of improved chemical and mechanical properties. Another object is to prepare a hydrocarbon resin of low iodine number, light color, and excellent stability. A further object is to prepare a useful hydrocarbon resin from a hydrocarbon-pyrolysis product fraction. A still further object is to minimize color formation in the preparation of resins from hydrocarbon-pyrolysis products. Another object is to minimize color formation during the separation of polymerization catalysts from hydrocarbon resins. Another object is to reduce or eliminate deterioration of hydrocarbon resins during the recovery thereof from reaction mixtures wherein the said resins are formed. Other objects of my invention and its advantages over the methods of the prior art will be apparent from the present disclosure and from the appended claims.

My invention will be most conveniently understood from the following specific examples, the first of which is to be read in conjunction with the attached flowsheet:

*Example I*

The charging stock required in my new process is a fraction of the products obtained in the high-temperature cracking of normally gaseous hydrocarbons having two or more carbons atoms in the molecule. Such a gaseous hydrocarbon or mixture of hydrocarbons, preferably propane, a mixture of propane and propylene, or a natural gas rich in propanes and/or butanes, is passed through preheater 11, where its temperature is raised as high as possible without effecting substantial cracking, suitably around 600 to 800° F., and is then passed into pyrolysis zone 12, comprising an alloy tube of small diameter supported within a furnace. Within the alloy tube, the hydrocarbon gas is exposed at slightly elevated pressure and high space velocity to a pyrolysis temperature of at least about 1300° F., preferably between about 1350 and 1550° F., and is converted thereby into a mixture of hydrocarbons containing a high proportion of unsaturated and aromatic components.

The hot gases leaving pyrolysis zone 12 pass directly into quenching zone 13, where they meet a spray of cold water, introduced through line 14, and are thereby cooled below reaction temperature, preferably to around 100° F. Further pyrolysis, polymerization, or degradation of the reaction products is prevented in this way. Water and a heavy liquid hydrocarbon condensate are withdrawn from the bottom of quenching zone 13 through line 15. From an upper section of quenching zone 13 a stream of uncondensed vapors emerges through line 16 and is raised to a pressure above about 350 pounds per square inch, preferably around 500 pounds per square inch, by compressor 17. From the compressor, the vapor stream flows through line 18 and after-cooler 19, which is maintained at around 200 to 300° F., and then through line 20 into separator 21, from which a small additional quantity of hydrocarbon condensate is withdrawn through line 22.

The vapor stream emerging from the top of separator 21 flows through line 23 into a lower section of absorber column 24, which is conveniently operated at the pressure supplied by compressor 17, suitably between about 350 and 700 pounds per square inch. Within the absorber, the vapors flow upward countercurrent to a stream of an absorber oil, and the unabsorbed gases flow from the top of the absorber column through line 25. The absorber oil is a liquid fraction obtained from the process in a subsequent step, to be described. It is introduced into the top of absorber 24 through line 26, preferably at ordinary or slightly elevated temperatures.

The enriched absorber oil flows from the bottom of absorber 24 through line 27, and is led through heater 28 and line 29 into an intermediate section of demethanizing column 30, wherein it is stripped of methane and any dissolved hydrogen by the action of reboiler 31. These gases are discharged from the top of column 30 and are led through line 32 into an intermediate point in absorber column 24. The demethanized absorber oil flowing from the bottom of column 30 through line 33 is led through heater 34 and line 35 into an intermediate section of fractionating column 36, equipped with reboiler 37, condenser 38, and reflux drum 39. From column 36 the $C_2$ and $C_3$ hydrocarbons are distilled overhead through the condenser and separator, and are refluxed in part to the column through line 40 and withdrawn in part through line 41. These materials may be recycled to pyrolysis zone 12 if desired.

The residual oil stream, now free from $C_3$ and lighter hydrocarbons, flows from the bottom of fractionator 36 through line 42 and is led through heater 43 and line 44 into an intermediate section of a second fractionating column 45, equipped with reboiler 46, condenser 47, and reflux drum 48. From column 45, a light fraction comprising principally $C_4$–$C_6$ hydrocarbons is distilled overhead through the condenser and separator, from which a part is refluxed through line 49 to column 45, a part is fed by pump 50 through line 26 to the top of absorber 24, where it serves as the absorber oil, and the remainder is withdrawn through line 51.

The liquid stream flowing from the bottom of fractionator 45 through line 52 is the charging stock employed for the production of resins in my new process. This material is a highly unsaturated oil having the following properties:

ASTM distillation range, °F.:
| | |
|---|---|
| Initial | 267 |
| 10% | 295 |
| 20% | 322 |
| 30% | 343 |
| 40% | 374 |
| 50% | 391 |
| 60% | 430 |
| 70% | 486 |
| 80% | 520 |
| 90% | 622 |
| Final | 667 |
| Iodine number (Wijs) | 334 |
| Color, ASTM | 1 |
| Maleic anhydride value, mg. M. A./g | 13 |
| Gravity, ° API at 60° F | 20.2 |
| $D_4^{25}$ | 0.930 |
| Refractive index, $n_D^{25}$ | 1.503 |

A 149-barrel batch of a charging stock prepared according to the above procedure was charged through line 52 into pressurized polymerization vessel 53, equipped with agitator 54 and jacket 55. Thereafter, the addition of gaseous $BF_3$ to the polymerizer was started through lines 56 and 57, the temperature of the bulk of the charging stock being at that time approximately 80° F. A slow rise in temperature was noted as the first three 60-pound cylinders of $BF_3$ were added, corresponding to 0.37 percent by weight of the charging stock. At 200° F., a highly exothermic reaction set in, and the temperature rose more rapidly until it attained a maximum rate of increase of approximately 50° F. per minute at 300 to 350° F. When the temperature continued to rise at 500° F., the reactor was depressured through lines 57 and 58 in order to control the reaction. The temperature dropped within 5 minutes after the reactor had been depressured; however, the reaction mixture was allowed to cool to 300° F. as a precautionary measure. The addition of $BF_3$ was resumed at this point, and it was noted that the reaction was only mildly exothermic; rapid addition of the catalyst was therefore possible. A total of 2 percent by weight of $BF_3$ (1080 pounds) was added, including the quantity added prior to the depressuring of the reactor, and the reaction mixture was heated to 350° F. and held for three hours by means of a heating fluid circulating to and from jacket 55 by way of lines 59 and 60 respectively. Samples of the reaction mixture were taken at hourly intervals following the resumption of the catalyst addition, and iodine numbers were determined on the resins separated therefrom. The following results were obtained:

| Time: | Iodine Number |
|---|---|
| 1 hour | 68 |
| 2 hours | 66 |
| 3 hours | 61 |
| 4 hours | 40 |

Since it was indicated that a resin of the desired low iodine number had been obtained, the reactor was vented and the reaction mixture was stripped to a softening point of 208° F. by means of gas and steam, introduced in succession into the bottom of polymerizer 53 through lines 61 and 62. The completed resin was cooled, withdrawn through lines 62 and 63, and barreled. A total of 36,000 pounds of resin was obtained in a yield of 83 percent by weight. The product had the following properties:

| | |
|---|---|
| Iodine number (Wijs) | 35 |
| Color, Barrett | 4 |
| Gravity, $D_4^{25}$ | 1.039 |
| Softening point, °F | 209 |
| Loss on heating | Nil |
| Cloud point | None |
| Acid number | Nil |

Example II

A series of tests were carried out in the following manner. In each test, 1200 milliliters of charging stock, prepared as described in Example I, were charged into a 2-liter stainless-steel bomb equipped with heaters and a thermocouple, $BF_3$ in the desired amount was added, and the bomb was heated and agitated in a mechanical shaker for a specified length of time at 500° F. The product was flashed and stripped to a softening point of approximately 210° F. The results of the tests were as follows:

| $BF_3$ Proportion, wt.-percent | Reaction Time, hr. | Resin Yield, wt.-percent | Color, Barrett | Iodine Number |
|---|---|---|---|---|
| 0.20 | 6 | 81 | 3 | 135 |
| 0.40 | 6 | 83 | 3 | 83 |
| 0.74 | 5 | 77 | 3 | 53 |
| 1.00 | 2 | 81 | 3 | 62 |
| 1.00 | 3 | 81 | 3 | 50 |
| 1.50 | 3 | 86 | 3 | 30 |
| 2.00 | 1 | 81 | 3 | 34 |

The foregoing results demonstrate that resins of good color and low iodine number can be produced by polymerization with approximately 0.5 percent by weight of $BF_3$ at 500° F. for a reaction period of around 5 hours.

Example III

Another series of tests were carried out according to the procedure described in Example II, employing lower temperatures. The results were as follows:

| $BF_3$ Proportion | Temp., °F. | Pressure, p.s.i g. | Reaction Time, hr. | Resin Yield, wt.-percent | Color, Barrett | Iodine Number |
|---|---|---|---|---|---|---|
| 0.98 | 380 | 100 | 5 | 89.7 | 3 | 100 |
| 1.10 | 360 | 50 | 3 | 90.5 | 3 | 76 |
| 1.63 | 380 | 120 | 3 | 89.0 | 3 | 52 |
| 2.20 | 380 | 100 | 3 | 90.0 | 3 | 49 |

From the foregoing data, it is apparent that my charging stock can be readily polymerized with $BF_3$ to a low iodine number resin of 3 Barrett color in yields as high as 90 percent by weight.

It was further found that the color of the resins produced in the above tests was improved from 3 Barrett to 1½ Barrett by filtering a 50 percent solution of resin in natural gasoline through calcined Attapulgus clay to a clay life of 50 barrels per ton. This represents a substantial improvement in color at a clay life that is industrially practical. Acid treating, in striking contrast, resulted in darker colors and in emulsion difficulties.

Example IV

A test was carried out in which 555 grams of charging stock, prepared as described in Example I, and 335 grams of xylene were charged into a 2-liter stainless-steel bomb equipped with heaters and a thermocouple. $BF_3$ (11.1 grams) was added, and the bomb was heated to 360° F. and agitated in a mechanical shaker for 3.0 hours. The reaction mixture developed a pressure of 135 pounds per square inch gauge during this time. The product was flashed at reaction temperature and stripped to a softening point of approximately 210° F. A resin was obtained in 88.1 weight-percent yield having an iodine number of 71 and a Barrett color of 4.

As indicated in the foregoing specific examples, my process comprises contacting a unique unsaturated charging stock, produced as described in Example I, with from about 0.5 to 5 percent BF₃ by weight, preferably 0.5 to 2 percent, to produce a resin of light color (less than about 5 Barrett), low iodine number (less than 80, ordinarily between about 30 and 50), and a ball-and-ring softening point between about 150 and 250° F. in a yield of about 80 to 90 percent by weight of the charging stock. The polymerization temperature should lie between about 300 and 650° F., preferably 350 to 550° F., varying inversely as a function of the BF₃ concentration; for example, at a BF₃ concentration of 1.6 percent by weight, the optimum polymerization temperature lies between about 350 and 380° F., and at a BF₃ concentration of 0.5 percent by weight, the optimum lies between about 500 and 550° F. Reaction periods from about 1 to 14 hours or more are satisfactory, but I prefer a period of about 3 to 6 hours. After the polymerization is completed, the BF₃ is removed by flashing and/or stripping with gas or steam, preferably at a temperature within the polymerization range, with or without recovery of the BF₃ for reuse.

Water has a detrimental influence in my process, and should therefore be removed substantially completely from the charging stock and other process materials. For this purpose, surface-active adsorptive solids such as silica gel and aluminum oxide are unsuitable; such materials catalyze exothermic reactions in my charging stock, and lead to the production of undesirably dark resins. My feed stock can conveniently be dried by passage through a bed of calcium chloride, anhydrous sodium sulfate, soda lime, or other dehydrating solid which has no appreciable polymerizing effect upon the unsaturated materials therein.

A preferred form of my process includes the following steps: A water-free portion of my charging stock, prepared as described in Example I, is charged into an evacuated or gas-blanketed reactor capable of withstanding a pressure of 500 pounds per square inch. BF₃ (0.5 percent by weight) is slowly introduced, preferably as a vapor stream, into the reaction zone while the reaction mixture is thoroughly agitated by suitable means. The rate of addition of BF₃ is so adjusted that the temperature does not exceed 120° F. during the catalyst addition. After all of the BF₃ has been added, the mixture is heated rapidly with vigorous agitation to a temperature of 500 to 550° F., where it is maintained for about 5 hours. At the end of this time, the BF₃ is flashed off at the reaction temperature and is compressed for reuse. The resulting resin is stripped with a hydrocarbon gas to a ring-and-ball softening point of 210° F., and is withdrawn and barreled.

Although I prefer to use boron trifluoride alone as the polymerization catalyst in my new process, complexes of boron trifluoride with various oxygenated organic compounds can also be used satisfactorily. For this purpose, complexes of boron trifluoride with ethyl ether, butyl ether, butyl alcohol, acetic acid, and the like are suitable. Such complexes are employed in proportions according to the equivalent BF₃ content thereof.

The polymerization can optionally be carried out in an inert solvent for the final resin, such as isooctane, natural gasoline, benzene, toluene, xylenes, or other aromatic or aliphatic hydrocarbon or mixtures thereof. The greater part of the solvent can suitably be removed from the polymerization product by distillation, the residual portion being removed in the final stripping of the resin.

The products of my invention are resins of iodine number below about 80, ordinarily between about 30 and 50, of color lighter than about 5 Barrett, ordinarily about 3 or lighter, of excellent color and mechanical stability, and having a ball-and-ring softening point between about 150 and 250° F. These resins are especially well adapted as components of mastic floor tiles, as components of oleoresinous varnishes either alone or in admixture with other varnish resins, as plasticizers and softeners for natural or synthetic rubber, and as extenders for rubber, ethyl cellulose, and ester gum in typical adhesives based thereon. Other uses will be apparent to those skilled in the art.

While I have described the process of my invention in connection with certain specific embodiments thereof and with reference to certain specific operating conditions, it will be apparent that I am not limited thereto, but may practice my invention in accordance with the broad disclosure thereof. It is further to be understood that any modifications or equivalents that would ordinarily occur to one skilled in the art are to be considered as lying within the scope of my invention.

In accordance with the foregoing description, I claim as my invention:

1. An improvement in a process for making a hydrocarbon resin by subjecting a hydrocarbon gas containing at least two carbon atoms in the molecule to pyrolysis at a temperature above about 1300° F., quenching the pyrolysis products and separating a gasiform stream therefrom, compressing said gasiform stream to a pressure above about 350 pounds per square inch, absorbing condensable hydrocarbons from said gasiform stream in a light absorption oil at said pressure, distilling the resulting solution and separating therefrom the constituents thereof having up to six carbon atoms in the molecule, leaving a highly unsaturated residue substantially free from conjugated diolefinic compounds, and catalytically polymerizing said residue, which improvement comprises effecting said polymerization in the presence of between about 0.5 and 5 percent by weight of a boron trifluoride catalyst at a temperature within the range of about 300 to 650° F., and subsequently stripping said catalyst and light components from the reaction product at a temperature within said range, whereby a thermoplastic resin is obtained having an iodine number below about 80 and a Barrett color lighter than about 5.

2. An improvement in a process for making a hydrocarbon resin by subjecting a hydrocarbon gas containing at least two carbon atoms in the molecule to pyrolysis at a temperature above about 1300° F., quenching the pyrolysis products and separating a gasiform stream therefrom, compressing said gasiform stream to a pressure above about 350 pounds per square inch, absorbing condensable hydrocarbons from said gasiform stream in a light absorption oil at said pressure, distilling the resulting solution and separating therefrom the constituents thereof having up to six carbon atoms in the molecule, leaving a highly unsaturated residue substantially free from conjugated diolefinic compounds, and catalytically polymerizing said residue, which improvement comprises effecting said polymerization in the presence of between about 0.5 and 5 percent by weight of a boron trifluoride catalyst at a temperature within the range of about 300 to 650° F., flashing said catalyst from the reaction product at a temperature within said range, treating said reaction product with an adsorbent solid, and stripping light components from said reaction product, whereby a thermoplastic resin is obtained having an iodine number below about 80 and a Barrett color not darker than about 3.

3. An improvement in a process for making a hydrocarbon resin by subjecting a hydrocarbon gas containing at least two carbon atoms in the molecule to pyrolysis at a temperature above about 1300° F., quenching the pyrolysis products and separating a gasiform stream therefrom, compressing said gasiform stream to a pressure above about 350 pounds per square inch, absorbing condensable hydrocarbons from said gasiform stream in a light absorption oil at said pressure, distilling the resulting solution and separating therefrom the con-stituents thereof having up to six carbon atoms in the molecule, leaving a highly unsaturated residue substantially free from conjugated diolefinic compounds, and catalytically polymerizing said residue, which improvement comprises effecting said polymerization in the presence of between about 0.5 and 2 percent by weight of boron trifluoride at a temperature within the range of about 350 to 550° F., subsequently flashing said boron trifluoride from the reaction product at a temperature within said range, and stripping light components from said reaction product, whereby a thermoplastic resin is obtained having an iodine number between about 30 and 50 and a Barrett color not darker than about 3.

4. An improvement in a process for making a hydrocarbon resin by subjecting a hydrocarbon gas containing at least two carbon atoms in the molecule to pyrolysis at a temperature above about 1300° F., quenching the pyrolysis products and separating a gasiform stream therefrom, compressing said gasiform stream to a pressure around 500 pounds per square inch, absorbing condensable hydrocarbons from said gasiform stream in a light absorption oil at said pressure, distilling the resulting solution and separating therefrom the constituents thereof having up to six carbon atoms in the molecule, leaving a highly unsaturated residue substantially free from conjugated diolefinic compounds, and catalytically polymerizing said residue, which improvement comprises effecting said polymerization by contacting said residue with about 0.5 to 2 percent by weight of boron trifluoride at a temperature within the range of about 350 to 550° F. for a period of about 1 to 14 hours, subsequently flashing said boron trifluoride from the reaction product at a temperature within said range, and stripping said reaction product to a ball-and-ring softening point between about 150 and 250° F., whereby a thermoplastic resin is obtained having an iodine number between about 30 and 50 and a Barrett color not darker than about 3.

5. In a process for making a thermoplastic resin having a ball-and-ring softening point between about 150 and 250° F., an iodine number below about 80, and a Barrett color lighter than about 5, which process comprises the steps of pyrolyzing a hydrocarbon gas containing at least two carbon atoms in the molecule at a temperature above about 1300° F., quenching the pyrolysis products and separating a gasiform stream therefrom, compressing said gasiform stream to a pressure above about 350 pounds per square inch, absorbing condensable hydrocarbons from said gasiform stream in a light absorption oil at said pressure, distilling the resulting solution and separately recovering therefrom light liquid and gaseous pyrolysis products, said light absorption oil, and a residual pyrolysis product fraction having an ASTM distillation range around 267 to 667° F., an iodine number (Wijs) around 334, and a maleic anhydride value around 13, and catalytically polymerizing the said residual pyrolysis product fraction, the improvement which comprises effecting said polymerization in the presence of between about 0.5 and 5 percent by weight of boron trifluoride at a temperature within the range of about 300 to 650° F., subsequently flashing said boron trifluoride from the resulting reaction product at a temperature within said polymerization range, and stripping light components from the said reaction product.

6. A process for making a thermoplastic resin having a ball-and-ring softening point around 210 F., an iodine number between about 30 and 50, and a Barrett color lighter than about 3, which comprises the steps of pyrolyzing a hydrocarbon gas containing at least two carbon atoms in the molecule at a temperature above about 1300° F., quenching the pyrolysis products and separating a gasiform stream therefrom, compressing said gasiform stream to a pressure above about 350 pounds per square inch, absorbing condensable hydrocarbons from said gasiform stream in a light absorption oil at said pressure, distilling the resulting solution and separately recovering therefrom light liquid and gaseous pyrolysis products, said light absorption oil, and a residual pyrolysis fraction having an ASTM distillation range of around 267 to 667° F., an iodine number (Wijs) around 334, and a maleic anhydride value around 13, removing any water and oxygen contained in said residual pyrolysis product fraction, introducing boron trifluoride to the extent of about 0.5 percent by weight into said residual pyrolysis product fraction while maintaining the temperature thereof below about 120° F., thereafter heating the resulting mixture rapidly with vigorous agitation to a temperature of 500 to 550° F. and maintaining the said temperature for about 5 hours, then flashing the $BF_3$ from the resulting reaction mixture at the said reaction temperature, and stripping light components from the reaction product, whereby said thermoplastic resin is obtained as a residual product.

References Cited in the file of this patent

UNITED STATES PATENTS

| | | |
|---|---|---|
| 2,039,364 | Thomas | May 5, 1936 |
| 2,161,599 | Towne | June 6, 1939 |
| 2,521,022 | Rowland | Sept. 5, 1950 |

OTHER REFERENCES

Groll: "Vapor-Phase Cracking," Ind. Eng. Chem. 25, pages 784–798 (pages 788, 789 relied on), July 1933.